(12) United States Patent
Hayashi et al.

(10) Patent No.: US 7,348,098 B2
(45) Date of Patent: *Mar. 25, 2008

(54) FLAT PRISMATIC BATTERY

(75) Inventors: Tetsuya Hayashi, Kadoma (JP); Makoto Nakanishi, Hirakata (JP); Kunihiko Bessho, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 587 days.

This patent is subject to a terminal disclaimer.

(21) Appl. No.: 10/936,305

(22) Filed: Sep. 8, 2004

(65) Prior Publication Data
US 2005/0031952 A1 Feb. 10, 2005

Related U.S. Application Data

(62) Division of application No. 10/149,731, filed on Jun. 13, 2002, now Pat. No. 6,893,773.

(51) Int. Cl.
*H01M 2/08* (2006.01)
*H01M 2/04* (2006.01)

(52) U.S. Cl. .................. 429/185; 429/162; 429/175; 429/176

(58) Field of Classification Search ........ 429/162–164, 429/175, 176, 185
See application file for complete search history.

(56) References Cited

U.S. PATENT DOCUMENTS 1,484,926 A 2/1924 Benner
4,419,420 A * 12/1983 Ishizaki .................. 429/185
6,893,773 B2 * 5/2005 Hayashi et al. ........... 429/162
2003/0077505 A1 4/2003 Goda et al.

FOREIGN PATENT DOCUMENTS

| JP | 59-33661 | 3/1984 |
|----|----------|--------|
| JP | 6-260172 | 9/1994 |
| JP | 10-255733 | 9/1998 |
| JP | 2000-164259 | 6/2000 |

* cited by examiner

*Primary Examiner*—Gregg Cantelmo
(74) *Attorney, Agent, or Firm*—Jordan and Hamburg LLP

(57) ABSTRACT

A power generation element is stored in an inner space formed by combining a battery case (2) and a seal case (3) formed as a half-shell body with a rectangular plane shape such that the individual openings are placed opposing to each other with a gasket (4) interposed therebetween, and the gasket (4) is pressed between the open end of the battery case (2) and a step (35) of the seal case (3) for sealing during caulking. Because recesses (36) are formed on the individual peripheral edges of a bottom surface (31) of the seal case (3), the strength of straight parts of a seal-case side-peripheral surface (32) of the seal case (3) increases against a seal pressure during caulking, and a decrease of seal capability caused by the straight parts bulging toward the outside during sealing is prevented.

4 Claims, 14 Drawing Sheets

FLAT PRISMATIC BATTERY

This is a divisional application of application Ser. No. 10/149,731, filed Jun. 13, 2002, and issued as U.S. Pat. No. 6,893,773 on May 17, 2005.

TECHNICAL FIELD

The present invention relates to flat primary and rechargeable batteries, and particularly relates to a flat prismatic battery.

BACKGROUND ART

Because flat batteries such as a button-shaped battery and a coin-shaped battery are small and thin, they are widely used for devices such as a wristwatch and a hearing aid which require reducing the size thereof, and devices such as an IC card which requires reducing the thickness thereof. FIGS. 17A and 17B show exteriors of a conventional coin-shaped battery. As shown in FIG. 18, a positive electrode pellet 42 and a negative electrode pellet 43 formed into a disk shape are placed opposing to each other with a separator 44 interposed therebetween in a seal case 45 formed as a circular half-shell body. Then, a gasket 46 is attached to an opening of the seal case 45 after electrolyte is filled, and a battery case 41 is placed over the seal case 45 before an open end of the battery case 41 is bent toward the inside for caulking. As a result, the opening of the seal case 45 is sealed to produce this coin-shaped battery 40. The plane shape is circular because the circle is proper for uniformly caulking the openings of the battery case 41 and the seal case 45 along the entire periphery for sealing.

If the plane shape of this flat battery is rectangular, the space efficiency of a battery storage of a device using the battery increases. Moreover, the discharge capacity, and consequently the application range of the flat battery increase because an electrode plate group having a wound structure is easily applied. Japanese Patent Laid-Open Publication No. 2000-164259 discloses a flat battery with a rectangular plane shape.

This flat prismatic battery as shown in FIGS. 19A and 19B is produced by the following steps. That is, a seal case 53 and a battery case 52 formed as a half-shell body with a round rectangular plane shape are placed while their openings are facing to each other, an electrode plate group with a wound structure is stored in an inner space of the seal case 53 and the battery case 52, and the battery case 52 and the seal case 53 are sealed together by shrinking an open end of the battery case 52 for caulking. However, because there is a difference in strength against the caulking between at a rounded corner and at a straight part connecting the corners with each other in the prismatic seal case 53, the straight parts are not surely sealed, and there is such a problem as preventing a leak is difficult.

Namely, when the battery case 52 and the seal case 53 formed as a prismatic half-shell body are placed opposing to each other with a gasket 54 interposed therebetween, and caulking is applied to bend the open end of a side peripheral surface 52a of the battery case 52 on a step 53b formed on a side peripheral surface 53a of the seal case 53 as shown in FIG. 20A, a deformation caused by pressing is not generated at the corners of the seal case 53, and the side peripheral surface 52a of the battery case 52 presses the gasket 54 on the step 53b to complete seal as shown in FIG. 20B. However, since a strength for withstanding the pressure during the caulking is not secured on the straight parts of the side peripheral surface 53a of the seal case 53, a deformation is generated on the step 53b at a location A, the side peripheral surface 53a extends toward the outside at a location B, and a bottom surface of the seal case 53 bulges at a location C as shown in FIG. 20C. When the seal case 53 deforms, the seal is not secured, and this causes a leak.

A double seaming method disclosed in Japanese Patent Laid-Open Publication No. Hei. 6-260172 is widely known as sealing method for preventing the deformation at the straight parts of the seal case. In this flat prismatic battery 60 shown in FIGS. 21 and 22, an electrode plate group 64 with a wound structure is stored in a battery case 61, and a seal plate 62 is provided at an opening of the battery case 61. Then, periphery thereof is seamed twice with a gasket 63 interposed therebetween to improve leak-proof capability. Simultaneously, electrically insulating a positive electrode and a negative electrode of the battery from each other is achieved.

However, there is such a problem as a seamed part 65 largely extends toward the outside of the battery main unit in the sealing using the double seaming as shown in the drawing, and the battery size increases. The purpose of forming the battery in a prismatic shape to increase the space efficiency is therefore not achieved. Also, it is necessary to round the corner of the prismatic case with a large radius for the double seaming, and it is difficult to form the case into a prismatic shape with high space efficiency.

An object of the present invention is to provide a flat prismatic battery with a prismatic shape with high space efficiency and a secure seal structure.

DISCLOSURE OF THE INVENTION

To achieve the above object, a flat prismatic battery according to a first aspect of the present invention includes a metal battery case formed as a polygonal half-shell body by rising a battery-case side-peripheral surface from a periphery of a polygonal bottom surface having corners rounded with a predetermined radius, and a metal seal case formed as a polygonal half-shell body by rising a seal-case side-peripheral surface provided with a step at a position corresponding to a raised height of the battery-case side-peripheral surface, and having a shape and a dimension separated from an inner surface of the battery-case side-peripheral surface by a uniform interval from a periphery of a polygonal bottom surface having corners rounded with a predetermined radius. The battery is characterized in that a plurality of recesses protruding toward the inside of the seal case are provided at a predetermined interval on individual peripheral edges of the bottom surface of the seal case, an inner space formed by placing openings of the battery case and the seal case opposing to each other with a gasket interposed therebetween stores a battery element, and the gasket is pressed and deformed between an open end of the battery case and the step of the seal case for sealing.

With the constitution described above, since the plurality of recesses protruding toward the inside of the seal case are provided on the peripheral edges of the bottom surface of the seal case, straight parts on the side peripheral surface of the seal case, which most tend to deform in the prismatic half-shell body, are reinforced. This eliminates the problem that the case deforms during sealing and the sealing becomes incomplete, and the prismatic flat battery is realized.

A flat prismatic battery according to a second aspect of the invention includes a metal battery case formed as a polygonal half-shell body provided with a battery-case side-peripheral surface, and a metal seal case formed as a polygonal half-shell body provided with a seal-case side-peripheral surface including a step narrowed at a position corresponding to a height of the battery-case side-peripheral surface while separated from the battery-case side-peripheral surface by a predetermined interval. The battery is characterized in that an inner space formed by placing individual openings of the battery case and the seal case opposing to each other with a gasket interposed therebetween stores a power generation element, the gasket is pressed between an open end of the battery-case side-peripheral surface and the step for sealing, and a part of the seal-case side-peripheral surface from a seal-case bottom surface of the seal case to the step, and the step are so formed as to have a thickness of 1.2 times or more of a thickness of the seal-case bottom surface. With the above constitution, since the part of the seal-case side-peripheral surface from the bottom surface of the seal case to the step, and the step are formed thicker than the bottom surface of the seal case, a deformation is prevented at the straight parts where the strength against the deformation cannot help decreasing during the caulking which bends the open end of the battery case on the step of the seal case. This prevents the sealing capability at the straight parts from decreasing when the cases are formed as prismatic, and a prismatic flat battery with high leak resistance is constituted.

A flat prismatic battery according to a third aspect of the invention includes a metal battery case formed as a polygonal half-shell body provided with a battery-case side-peripheral surface, and a metal seal case formed as a polygonal half-shell body provided with a seal-case side-peripheral surface. The battery is characterized in that an inner space formed by placing individual openings of the battery case and the seal case opposing to each other with a gasket interposed therebetween stores a power generation element, the gasket is pressed between an open end of the battery-case side-peripheral surface and a seal-case bottom surface of the seal case for sealing, and the seal-case side-peripheral surface is so formed as to have a thickness of 1.2 times or more of a thickness of the seal-case bottom surface.

With the constitution of the third aspect, when the open end of the battery case is bent toward the inside of the case for sealing, a pressure for bending the open end is applied from a direction of an extension of the seal-case side-peripheral surface. This prevents a generation of a buckling which deforms the seal-case side-peripheral surface is restrained when the pressure is applied on the seal-case side-peripheral surface in a direction of this surface. Thus the straight parts, which tend to deform most when the prismatic battery is sealed, hardly deform, and the flat prismatic battery is sealed without generating a buckling.

BEST MODE FOR CARRYING OUT THE INVENTION

The following describes embodiments of the present invention while referring to the attached drawings for comprehension of the invention. The embodiments described below are examples of embodying the present invention, and do not limit the technical scope of the invention.

Figure 1:
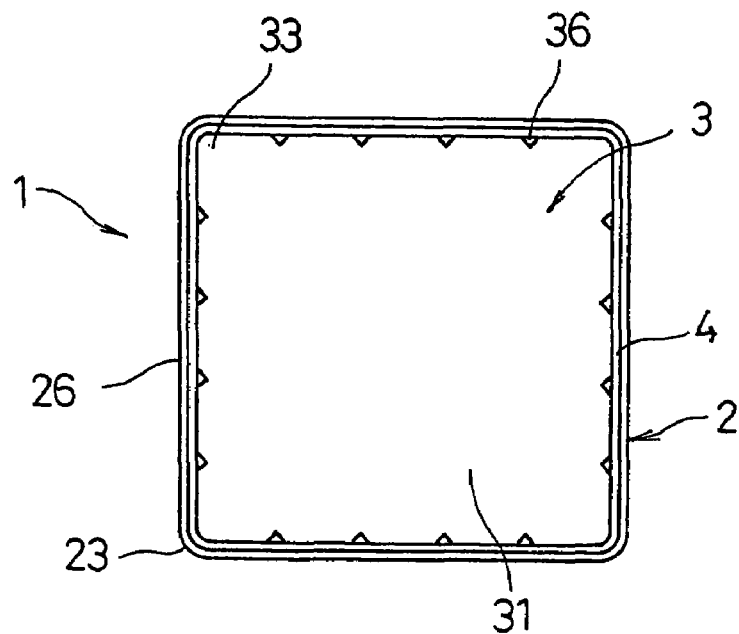
FIG. 1 is a plan view of a flat prismatic battery according to a first embodiment of the present invention.

A flat prismatic battery 1 according to a first embodiment of the present invention is constituted as a flat battery in almost a rectangular shape having rounded corners with a small radius at corners of a square as shown in FIG. 1. The battery 1 has a power generation element stored in a battery case 2 and a seal case 3 serving as exterior bodies, and is applied to both a primary battery and a rechargeable battery. The following shows a specific constitution example of a flat prismatic lithium ion rechargeable battery which is formed as a rounded square shape with a diagonal dimension of 30 mm for storing an electrode plate group having a wound structure.

Figure 3:
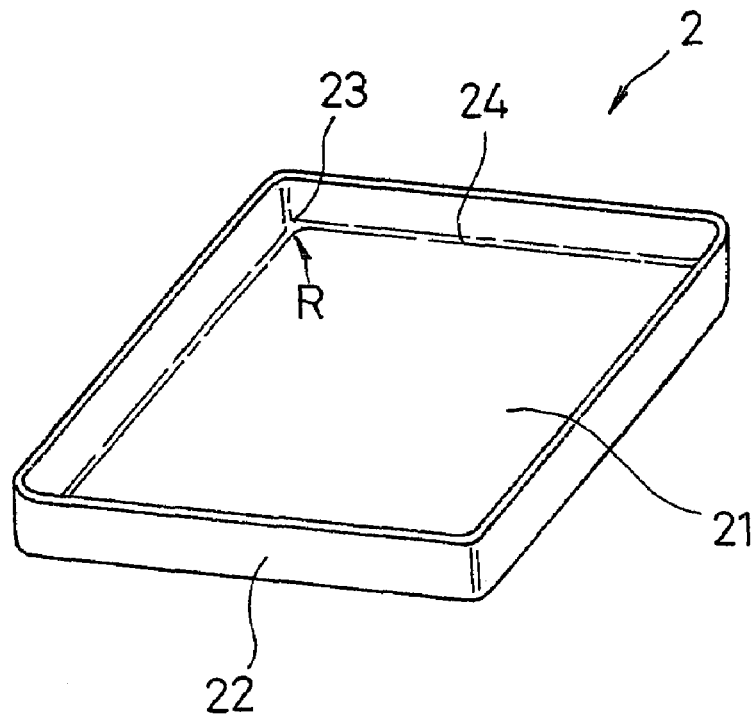
FIG. 3 is a perspective view showing a constitution of a battery case.

The battery case 2 is formed as a half-shell body with a rectangular plane shape which is produced from a stainless plate with a thickness of 0.2 mm using metal press forming as shown in FIG. 3. A bottom surface 21 of the battery case 2 is a rectangle having rounded corners 23 with a predetermined radius R, and the battery case 2 is formed such that a battery-case side-peripheral surface 22 rises from bends 24 which are peripheral edges of the bottom surface 21. Simultaneously, the battery case 2 is formed such that the radius R of the rounded corners 23 and the thickness $t_1$ of the battery case 2 has a relationship of $2t_1<R<20t_1$.

Figure 4:
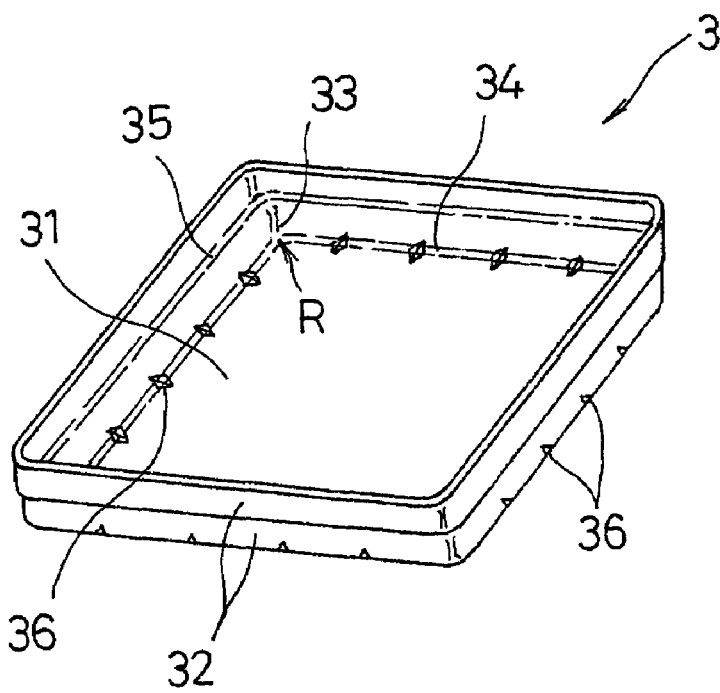
FIG. 4 is a perspective view showing a constitution of a seal case.

The seal case 3 is formed as a half-shell body with a rectangular plane shape which is produced from a stainless plate with a thickness of 0.2 mm using metal press forming as shown in FIG. 4. A bottom surface 31 of the seal case 3 is a rectangle with rounded corners 33, and a step 35 is formed at a predetermined height on a seal-case side-peripheral surface 32 rising from bends 34 which are peripheral edges of the bottom surface 31. It is preferable to form the step width of the step 35 so as to be 0.5 to 5 times of the thickness of the seal case 3. Simultaneously, the seal case 3 is formed such that the radius R of the rounded corners 33 and the thickness $t_2$ of the seal case 3 has a relationship of $2t_2<R<20t_2$. A plurality of V-shape notches (recesses) 36 are formed at a predetermined interval so as to protrude toward the inside of the seal case 3 on the bends 34 which are the peripheral edges of the bottom surface 31 from which the seal-case side-peripheral surface 32 rises.

Figure 5:
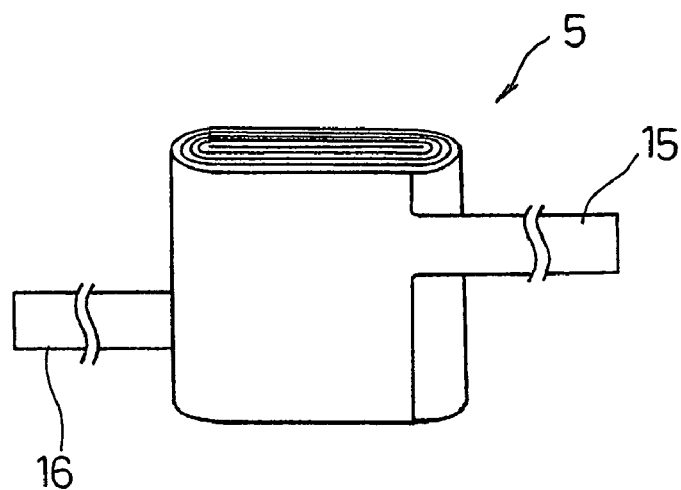
FIG. 5 is a perspective view showing a constitution of an electrode plate group having a wound structure.

An electrode plate group 5 is formed such that a positive electrode plate produced by coating a positive electrode collector with a positive electrode material, and a negative electrode plate produced by coating a negative electrode collector with a negative electrode material are individually cut into belts, the positive electrode plate and the negative electrode plate are wound with a separator interposed therebetween into a flat shape, a positive electrode lead 15 is extended from the positive electrode collector of the positive electrode plate placed on one plane, and a negative electrode lead 16 is extended from the negative electrode collector of the negative electrode plate placed on the other plane as shown in FIG. 5.

Figure 2:
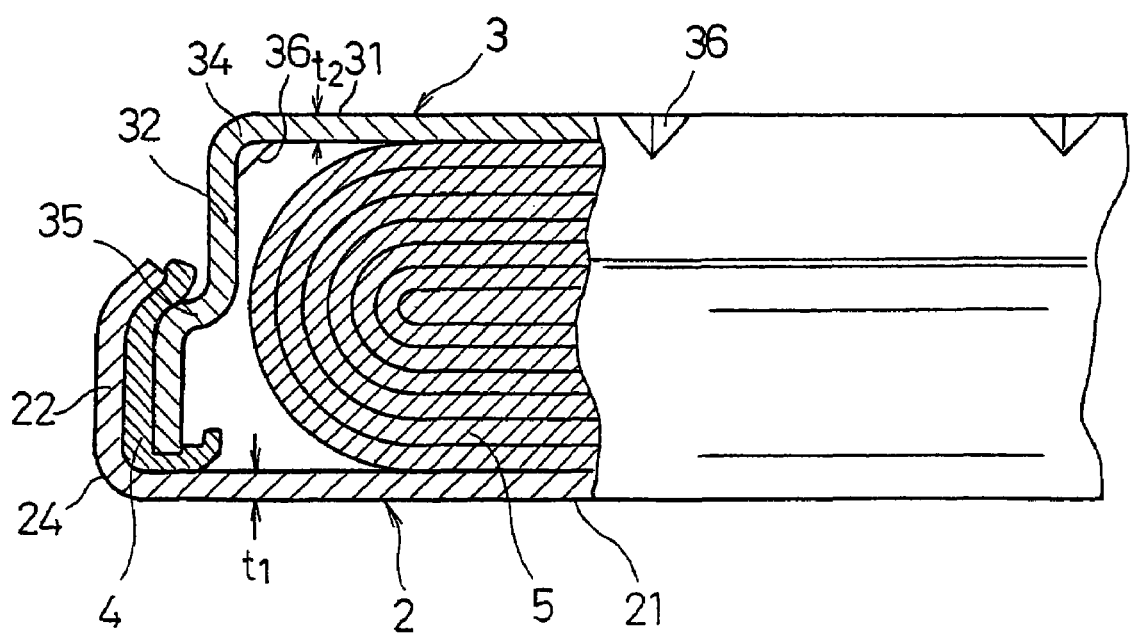
FIG. 2 is a sectional view showing a constitution of the flat prismatic battery according to the embodiment.

As shown in FIG. 2, a resin gasket 4 is attached to an open end of the seal-case side-peripheral surface 32 of the seal case 3 constituted as described above. The electrode plate group 5 is stored in the seal case 3. The negative electrode lead 16 and the positive electrode lead 15 extended from the electrode plate group 5 are welded and connected to an inner surface of the seal case 3 and to an inner surface of the battery case 2 respectively, and then a predetermined quantity of electrolyte is dropped in the seal case 3. The battery case 2 is placed over the seal case 3 after the electrolyte is impregnated into the electrode plate group 5, and the battery case 2 and the seal case 3 are sealed together, thereby forming the flat prismatic battery 1 shown in FIGS. 1 and 2. In the sealing, a sealing die is used in press process to bend the open end of the battery-case side-peripheral surface 22 of the battery case 2 toward the seal case 3, and to press the gasket 4 onto the step 35 of the seal-case side-peripheral surface 32.

When such a prismatic battery as one shown in the present embodiment is sealed, because there is a difference in deformation stress between at the corners 33 of the seal-case side-peripheral surface 32 of the seal case 3, and at straight parts connecting the individual corners 33 with each other, the straight parts tend to buckle and deform toward the inside more than the corners 33 upon applying the pressure for sealing. As a result, the straight parts are not sealed sufficiently, and a state which tends to leak arises. This state is common to prismatic batteries formed using a thin metal plate, and the double seaming is necessary for realizing a seal for preventing a leak as described in the section of BACKGROUND ART.

With the constitution of the present embodiment, since the plurality of V-shape notches 36 are formed at the bends 34 on the periphery of the bottom surface 31 of the seal case 3 as described above, the stiffness of the straight parts increases and the deformation is restrained. Further, a difference in the strength against the deformation between at the corners 33 and at the straight parts decreases, the seal is secured even for the prismatic shape, and the leak is prevented.

Figure 6:
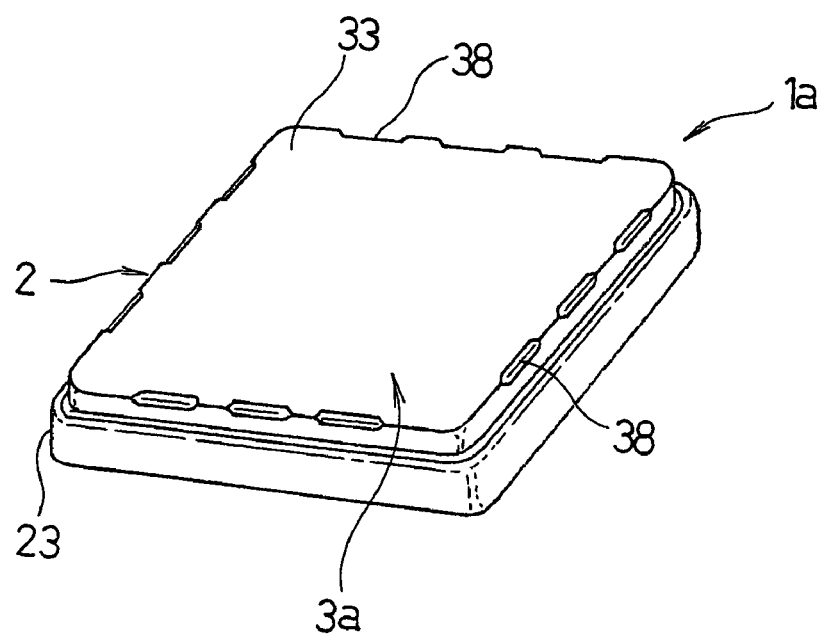
FIG. 6 is a perspective view showing another flat prismatic battery.

Forming recesses 38 protruding toward the inside of the seal case at multiple locations on the straight parts of the bends 34 as shown in FIG. 6 provides a similar effect as a structure for increasing the strength against deformation of the seal-case side-peripheral surface 32 of the seal case 3.

When the open end of the battery-case side-peripheral surface 22 is bent toward the inside of the case for sealing for the battery case 2, because there is a difference in deformation stress between the corners 23 and battery case straight parts 26 connecting the individual corners 23 with each other, an action to bulge the straight parts 26 toward the outside tends to occur, and the seal may not be conducted sufficiently. The present embodiment constitutes a battery case 2a which facilitates caulking the open end of the battery-case side-peripheral surface 22 toward the inside of the case, and prevents the battery-case side-peripheral surface 22 from deforming during the caulking.

Figure 7:
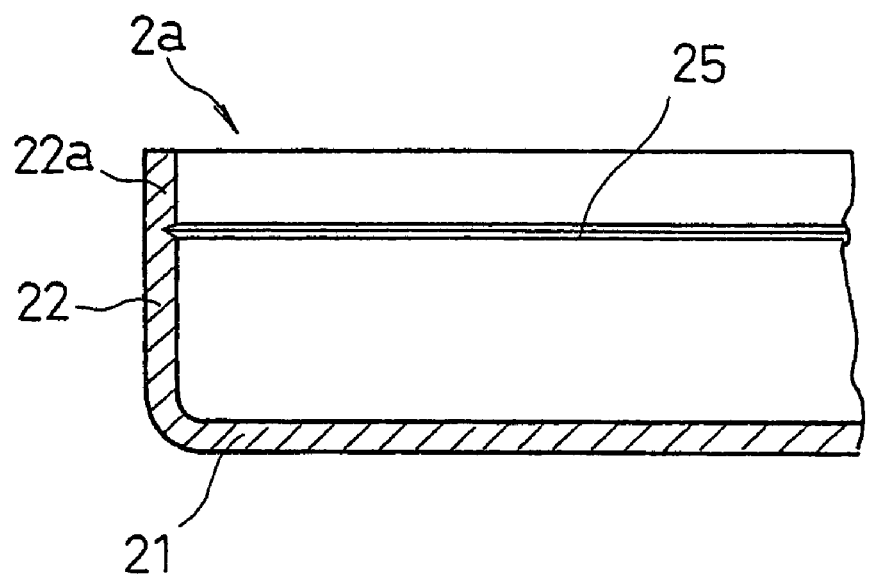
FIG. 7 is a sectional view showing a V-shape groove formed in a battery case for preventing the battery case from being deformed.

As shown in FIG. 7, a V-shape groove 25 having a V-shape section is formed at the bending height on the inner surface of the battery-case side-peripheral surface 22 of the battery case 2a. It is preferable to form this V-shape groove 25 so as to have its depth of 0.05 mm when the material thickness is 0.2 mm, and the V-shape groove 25 is formed on the entire periphery including the straight parts 26 on the four surfaces and the corners 23. When this V-shape groove 25 is formed, an open end 22a of the battery-case side-peripheral surface 22 is easily bent at the groove 25 toward the inside of the case during the sealing. Thus, an excessive bending stress is not applied to the battery-case side-peripheral surface 22, and especially, the straight parts 26 are restrained from bulging toward the outside of the case.

Figure 8:
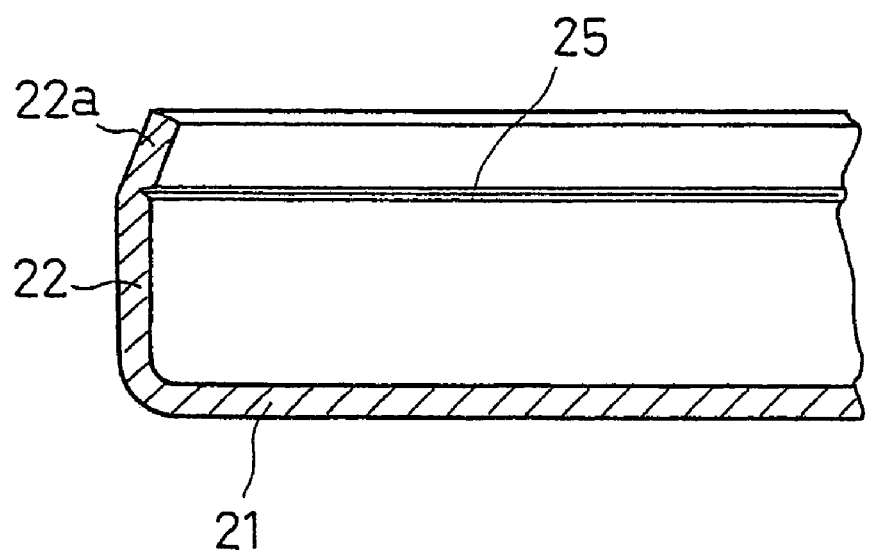
FIG. 8 is a sectional view showing a state where a pre-curl is applied to a battery case.

After the V-shape groove 25 is formed, when a pre-curl is conducted for bending the open end 22a upper than the location for forming the V-shape groove 25 on the battery-case side-peripheral surface 22 toward the inside of the case at a predetermined angle as shown in FIG. 8, the open end 22a on the battery-case side-peripheral surface 22 is bent easily during the sealing, an excessive deformation stress is not applied on the battery-case side-peripheral surface 22, and the battery case 2 is securely sealed with the seal case 3.

Figure 9:
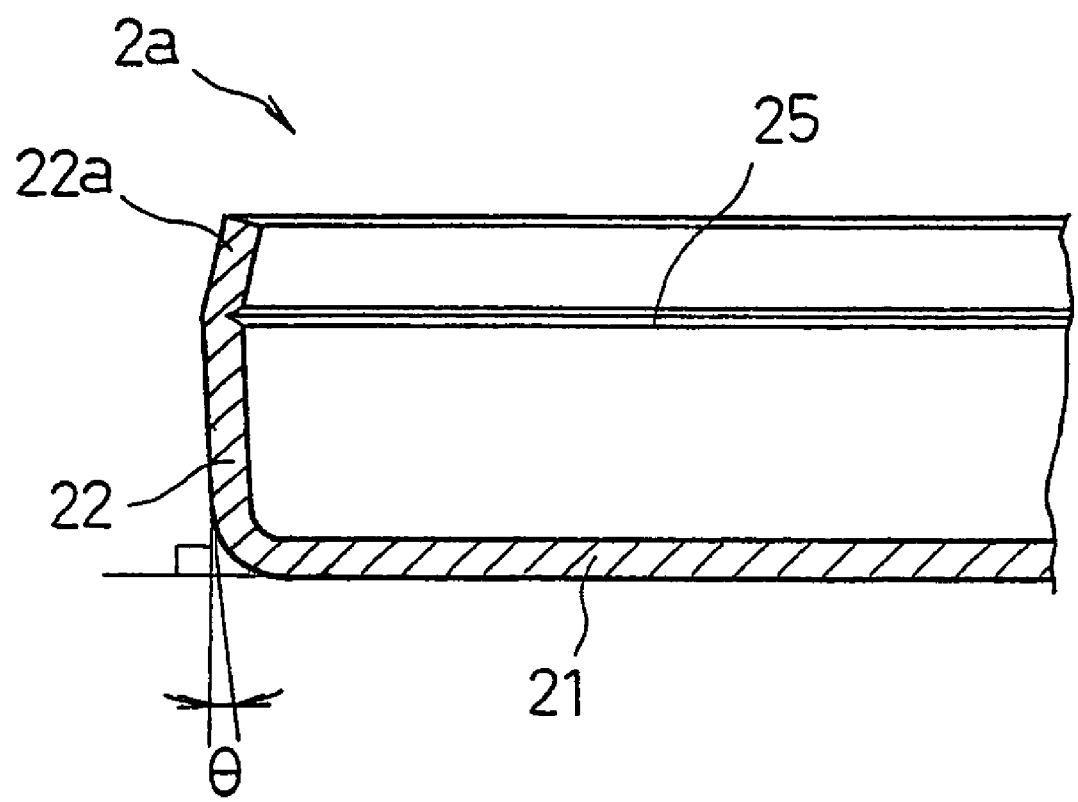
FIG. 9 is a sectional view showing another structure for preventing a deformation of a battery case.

As shown in FIG. 9, after the battery-case side-peripheral surface 22 is tilted at a small angle θ against the vertical line to the bottom surface 21, a pre-curl is applied to bend the open end 22a of the battery-case side-peripheral surface 22 toward the inside of the case at a predetermined angle as a machining for extending the diameter of the opening of the battery case 2a on which the V-shape groove 25 is formed. As a result, since it is possible to smoothly place the battery case 2 over the seal case 3 on which the gasket 4 is attached, and simultaneously, the pre-curl facilitates bending the open end 22a of the battery-case side-peripheral surface 22, an excessive deformation stress is not applied on the battery-case side-peripheral surface 22, and the sealing is secured.

With the constitution described above, it is preferable to provide a simple substance or an alloy of nickel or aluminum with a thickness of 0.005 mm or more as a protection layer on the inner surface of the battery case 2 serving as the positive electrode of the flat prismatic battery 1. This prevents the base material metal (stainless steel in this case) from dissolving due to an electrical potential difference.

Means such as cladding, plating or vapor deposition forms the protection layer. It is also preferable to provide copper or alloy thereof with a thickness of 0.005 mm or more as a protection layer on the inner surface of the seal case 3 serving as the negative electrode of the flat prismatic battery 1. This prevents the base material metal (stainless steel in this case) from dissolving due to an electrical potential difference. While the battery case 2 is set to the positive electrode, and the seal case 3 is set to the negative electrode in the embodiment, the positive electrode and the negative electrode may be set inversely.

While the present embodiment shows an example where the winding structure is applied to the electrode plate group 5 for increasing the battery capacity, it is possible to apply an electrode structure where a positive pellet and a negative pellet formed as a rounded square corresponding to the shape of the inner space of the battery are placed opposing to each other with a separator interposed therebetween.

While the plane shape of the flat prismatic battery 1 is a square with rounded corners in the embodiment, it is possible to form the plane shape as a rectangle without an excessive difference between the long side and the short side. It is also possible to form the plane shape as a polygon having four edges or more.

Figure 10:
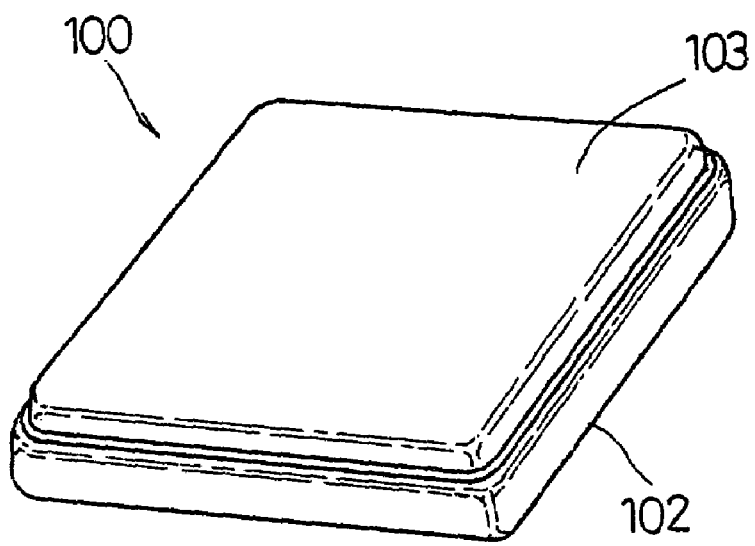
FIG. 10 is a perspective view of a flat prismatic battery according to a second embodiment of the invention.

The following describes a flat prismatic battery according to a second embodiment of the present invention. The flat prismatic battery 100 according to the present embodiment is constituted as a flat prismatic battery in a square shape having rounded corners with a small radius as shown in FIG. 10. The battery 100 has a power generation element stored in a battery case 102 and a seal case 103 serving as exterior bodies, and is applied to both a primary battery and a rechargeable battery. The following shows a specific constitution example of a flat prismatic lithium ion rechargeable battery which is formed as a rounded square shape with a diagonal dimension of 30 mm for storing the electrode plate group 5 with a wound structure.

Figure 11:
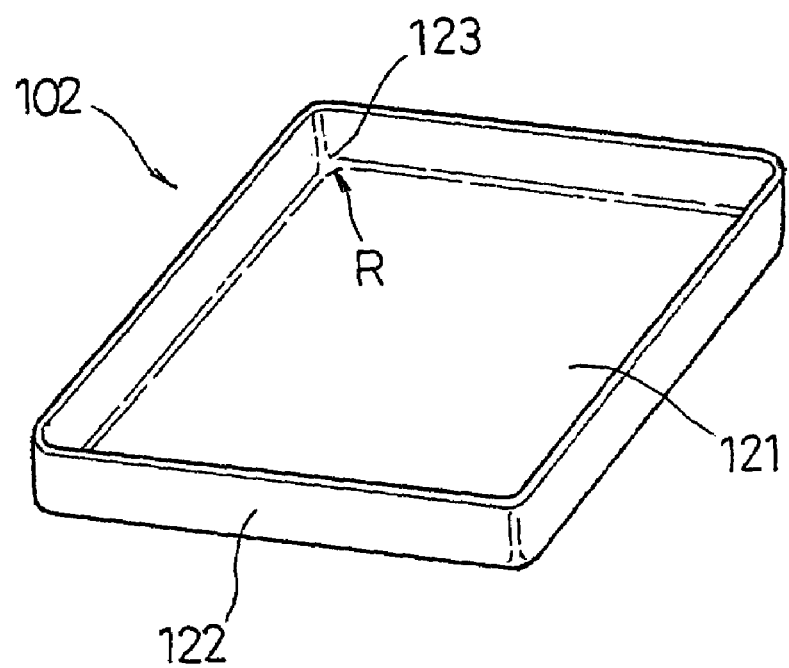
FIG. 11 is a perspective view showing a constitution of a battery case.

As shown in FIG. 11, the battery case 102 is formed as a half-shell body with a rectangular plane shape which is produced from a stainless plate with a thickness of 0.2 to 0.25 mm using metal press forming. A bottom surface 121 of the battery case 102 is a rectangle having rounded corners 123 with a predetermined radius R, and the battery case 102 is formed such that a battery-case side-peripheral surface 122 rises from peripheral edges of the bottom surface 121. Simultaneously, the battery case 102 is formed such that the radius R of the rounded corners 123 and the thickness $t_1$ of the battery case 102 has a relationship of $2t_1 < R < 20t_1$.

Figure 12:
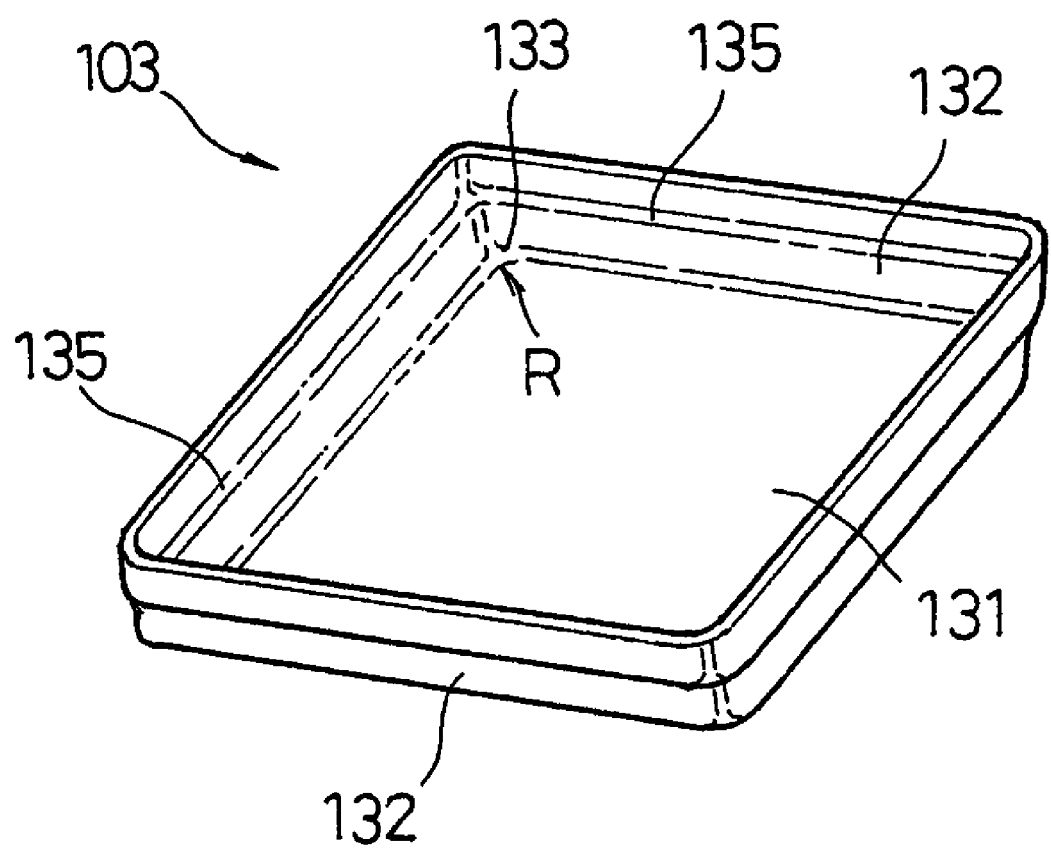
FIG. 12 is a perspective view showing a seal case.

As shown in FIG. 12, the seal case 103 is formed as a prismatic half-shell body which is produced from a stainless plate with a thickness of 0.2 to 0.25 mm using metal press forming. A bottom surface 131 of the seal case 103 is a rectangle with rounded corners 133, and a step 135 is formed at a predetermined height on a seal-case side-peripheral surface 132 rising from peripheral edges of the bottom surface 131. It is preferable to form the step width of the step 135 so as to be 5 to 10 times of the thickness of the seal case 103. Simultaneously, the seal case 103 is formed such that the radius R of the rounded corners 133 and the thickness $t_2$ of the seal case 103 has a relationship of $2t_2 < R < 20t_2$. A part of the seal-case side-peripheral surface 132 from the bottom surface 131 to the step 135, and the step 135 are 1.2 times or more as thick as the bottom surface 131 as shown in sectional views in FIGS. 13A and 13B.

The electrode plate group 5 is finished such that positive electrode plate produced by coating a positive electrode collector with a positive electrode material, and a negative electrode plate produced by coating a negative electrode collector with a negative electrode material are individually cut into belts, the positive electrode plate and the negative electrode plate are wound with a separator interposed therebetween into a flat shape, the positive electrode lead 15 is placed on one face, and the negative electrode lead 16 is placed on another face as shown in FIG. 5.

Figure 13A:
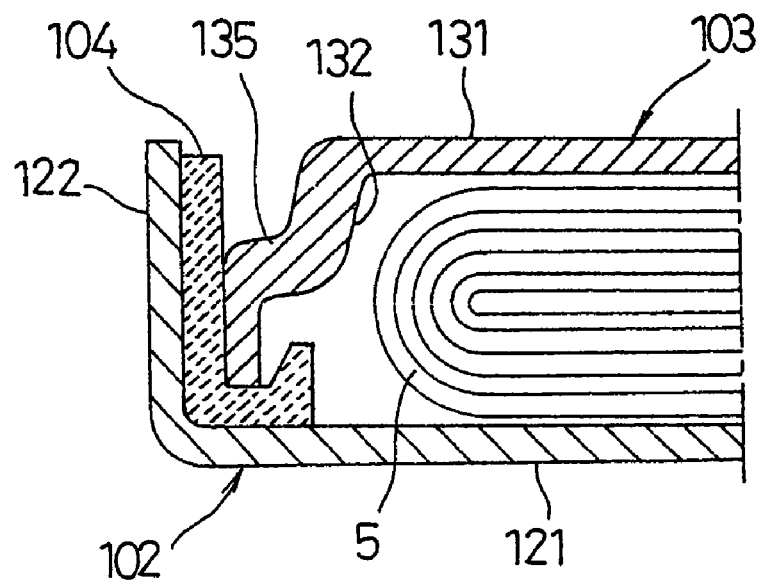
FIG. 13A is a sectional view showing an assembled state of the flat prismatic battery.
Figure 13B:
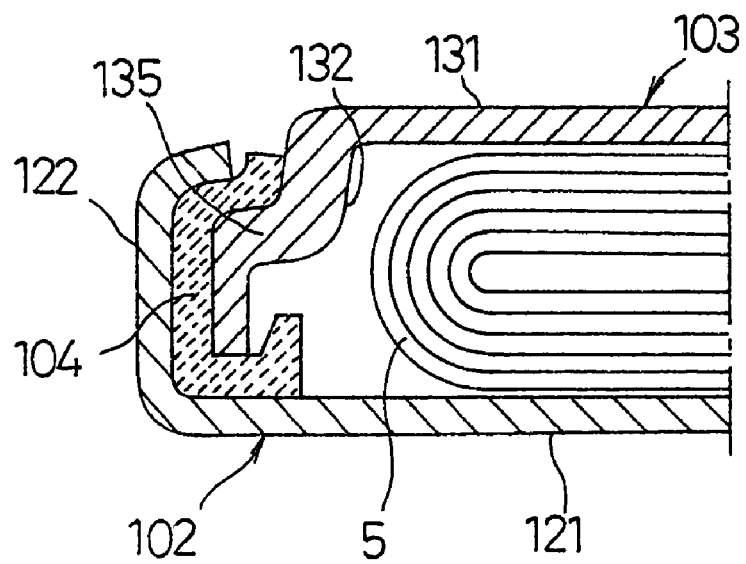
FIG. 13B is a sectional view showing a sealed state.

As shown in FIG. 13A, a resin gasket 104 is attached to an open end of the seal-case side-peripheral surface 132 of the seal case 103 constituted as described above. The electrode plate group 5 is stored in the seal case 103. The negative electrode lead 16 and the positive electrode lead 15 extended from the electrode plate group 5 are welded and connected to an inner surface of the seal case 103 and to an inner surface of the battery case 102 respectively. Then, a predetermined quantity of electrolyte is dropped in the seal case 103, the battery case 102 is placed over the seal case 103 after the electrolyte is impregnated into the electrode plate group 5. The battery case 102 and the seal case 103 are sealed together, thereby forming the flat prismatic battery 100 shown in FIG. 10. In the sealing, a sealing die is used in press process to bend the open end of the battery-case side-peripheral surface 122 of the battery case 102 toward the seal case 103, and to press the gasket 104 onto the step 135 of the seal-case side-peripheral surface 132 as shown in FIG. 13B.

Figure 14:
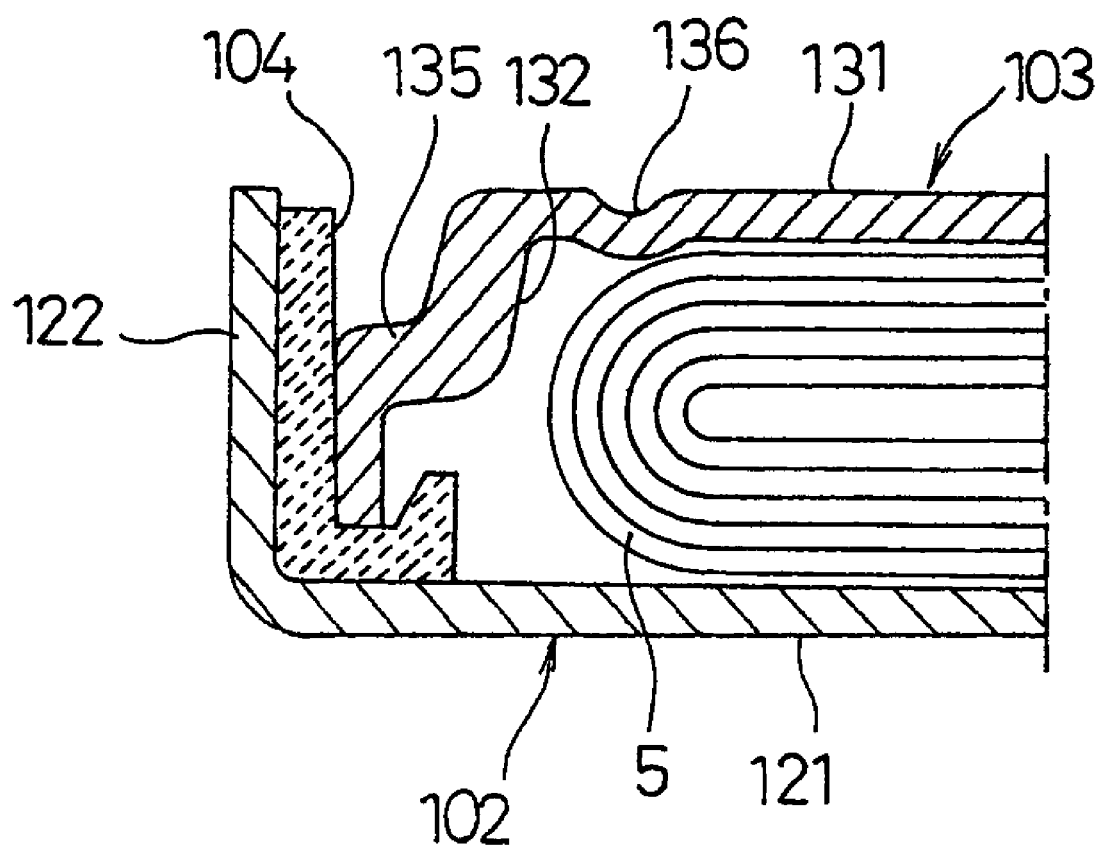
FIG. 14 is a sectional view showing an alternative mode of the flat prismatic battery.

When a recess 136 is formed along individual peripheral edges inside the peripheral edges on the bottom surface 131 of the seal case 103 as shown in FIG. 14, strength against deformation of the bottom surface 131 increases, and the deformation of the bottom surface 131 caused by pressing during the sealing is prevented. Though the recess 136 may be formed along the entire periphery of the bottom surface 131 having a square plane shape, it may be formed along only the straight parts of the four edges, so as to reinforce the straight parts of the four edges which are weaker than the corners 133.

When such a prismatic battery as one shown in the present embodiment is sealed, because there is a difference in strength against deformation between at the corners 133 of the seal-case side-peripheral surface 132 of the seal case 103, and at the straight parts connecting the individual corners 133 with each other, the straight parts of the seal-case side-peripheral surface 132 tend to buckle and deform toward the inside upon applying the pressure for sealing. As a result, the straight parts are not sealed sufficiently, and a state which tends to leak arises. However, since the seal case 103 is formed thick from the bottom surface 131 to the step 135 as described before, the stiffness of the straight parts increases. Thus, the deformation is restrained. Further, the difference in the strength against the deformation between at the corners 133 and at the straight parts decreases, the seal is secured even for the prismatic shape, and the leak is prevented.

Figure 15A:
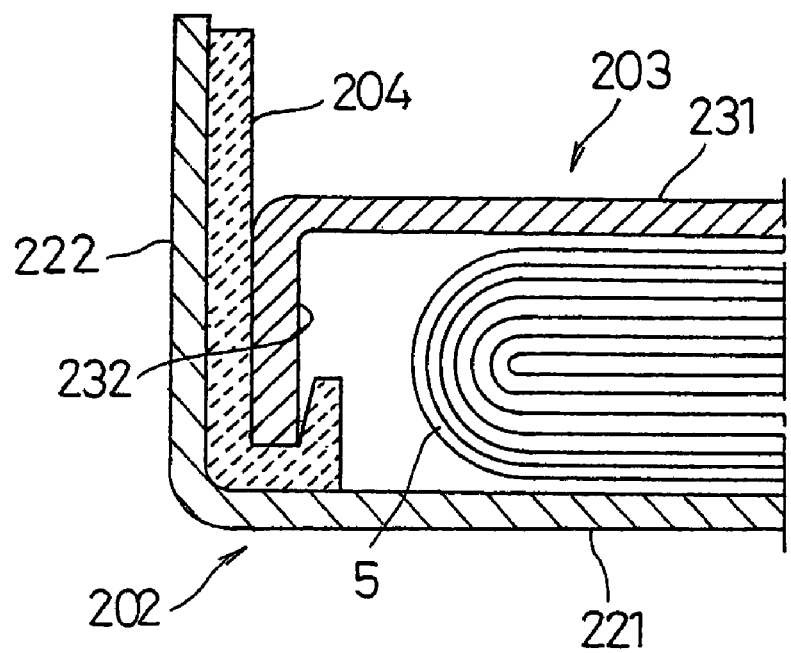
FIG. 15A is a partial sectional view showing a state before caulking a flat prismatic battery according to a third embodiment of the invention.
Figure 15B:
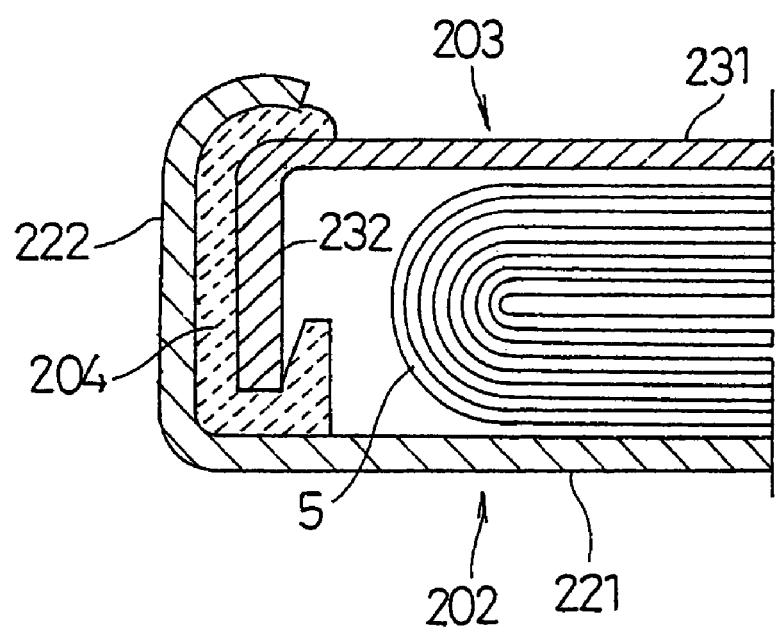
FIG. 15B is a partial sectional view showing a completed state of the flat prismatic battery.

As a case structure for preventing the buckling at the straight parts during the sealing using caulking when the case is formed into a prismatic shape, it is possible to adopt a case structure of a third embodiment as shown in FIGS. 15A and 15B in addition to those of the first and second embodiments described above.

In FIG. 15A, a battery case 202 formed as a prismatic half-shell body, and a seal case 203 also formed as a prismatic half-shell body are combined while a gasket 204 is provided between a battery-case side-peripheral surface 222 and a seal-case side-peripheral surface 232. Then, a pressure is applied from a direction of an extension of the seal-case side-peripheral surface 232 to bend an open end of the battery-case side-peripheral surface 222 toward the inside as shown in FIG. 15B. As a result of this pressure, the open end of the battery-case side-peripheral surface 222 presses the gasket 204 on a bottom surface 231 of the seal case 203, and simultaneously, an open end of the seal-case side-peripheral surface 232 presses the gasket 204 on the inside of a bottom surface 221 of the battery case 202 as shown in the drawing. This seals the battery case 202 and the seal case 203 together, and electrolyte contained in the inner space is prevented from leaking outside.

Figure 16:
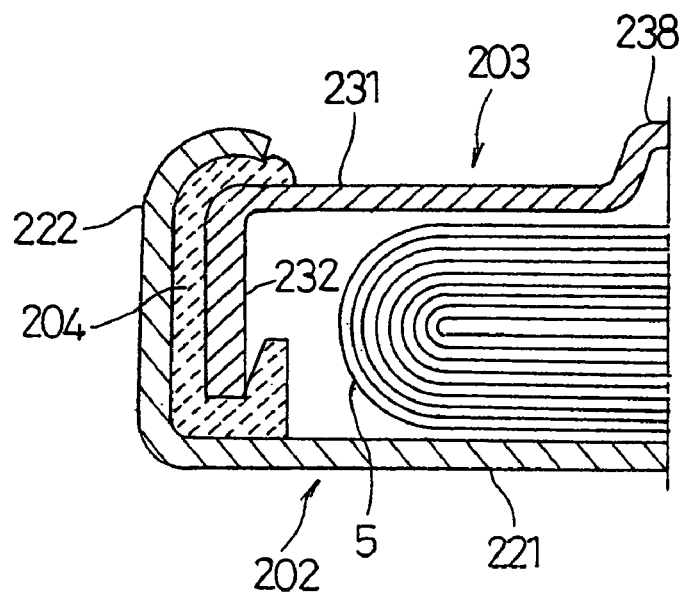
FIG. 16 is a partial sectional view showing a constitution for improving connectivity of a battery connection.
Figure 17A:
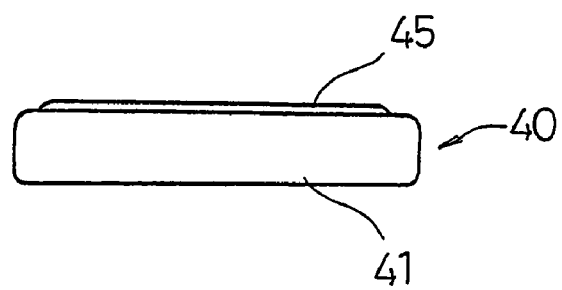
FIG. 17A is a side view showing a conventional circular flat battery.
Figure 17B:
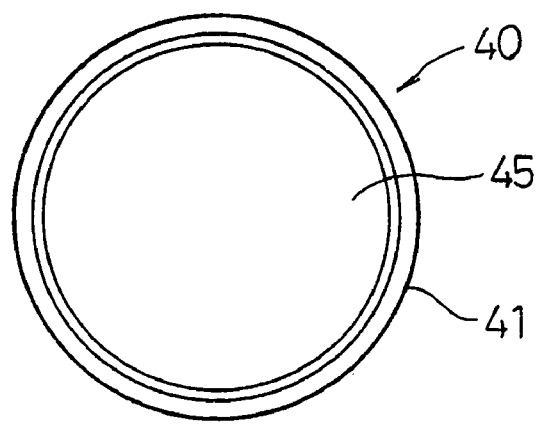
FIG. 17B is a plan view thereof.
Figure 18:
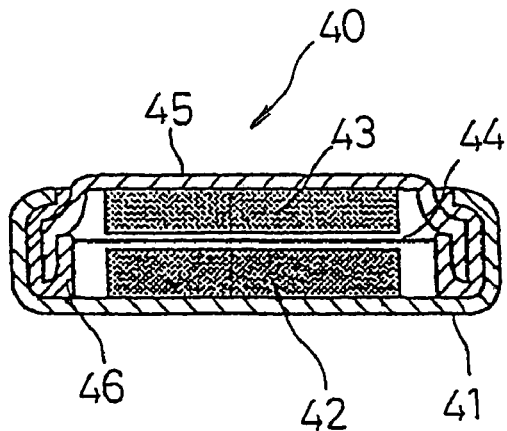
FIG. 18 is a sectional view showing a constitution of the conventional circular flat battery.
Figure 19A:
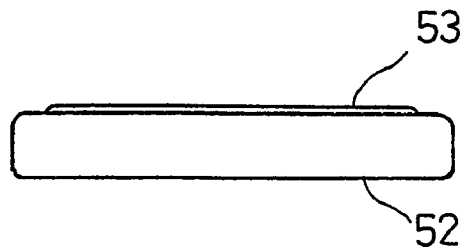
FIG. 19A is a side view showing a conventional flat prismatic battery.
Figure 19B:
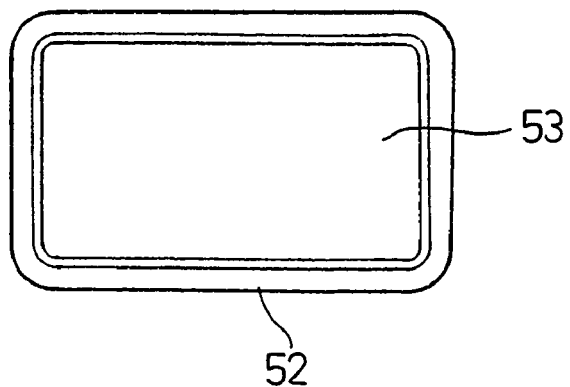
FIG. 19B is a plan view thereof.
Figure 20A:
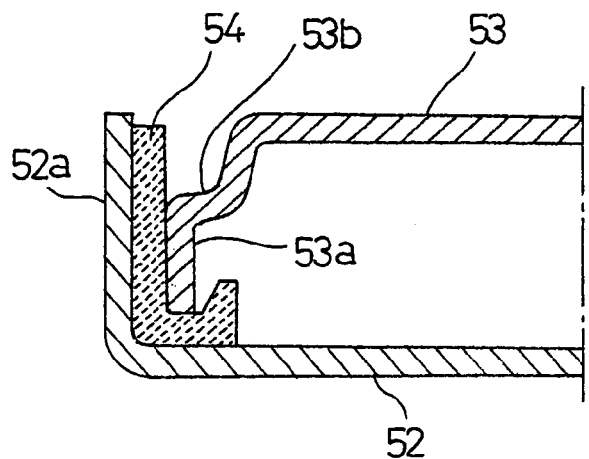
FIG. 20A is a sectional view showing an assembled state of the conventional flat prismatic battery.
Figure 20B:
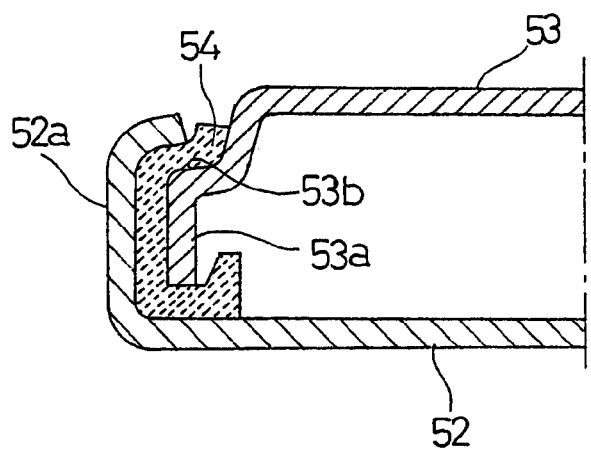
FIG. 20B is a sectional view of a corner after caulking.
Figure 20C:
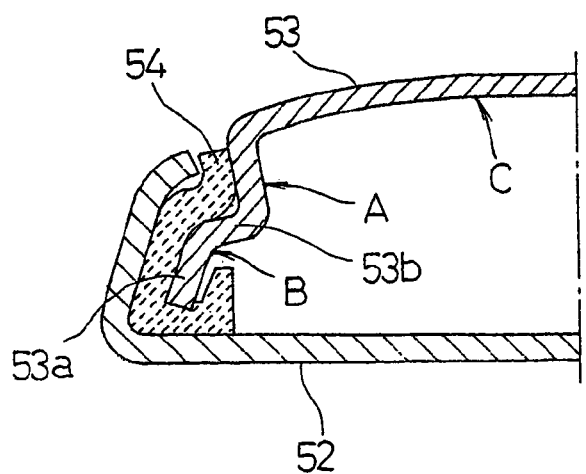
FIG. 20C is a sectional view showing a buckled state of a straight part after sealing.
Figure 21:
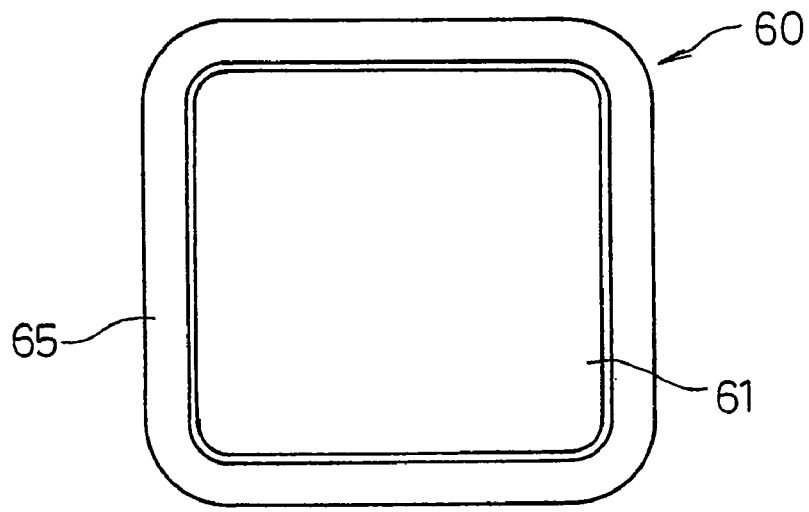
FIG. 21 is a plan view showing a constitution of a conventional flat prismatic battery.
Figure 22:
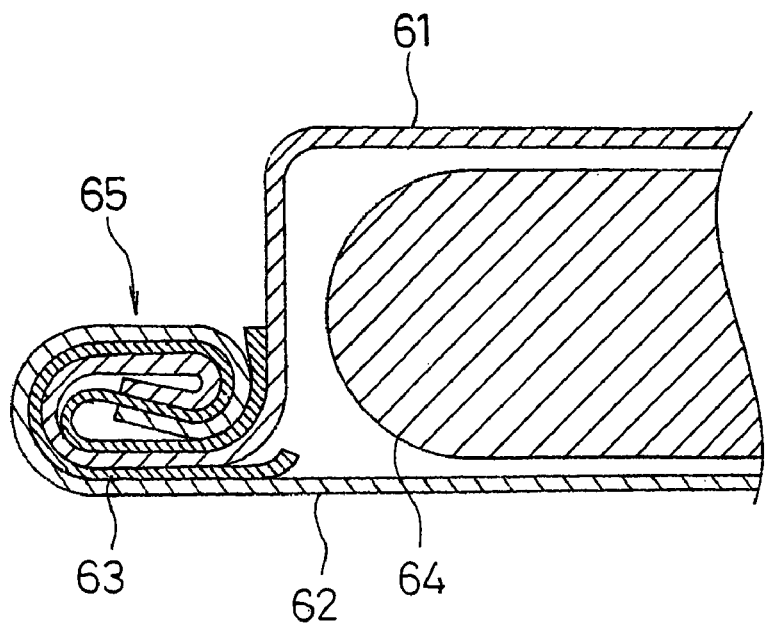
FIG. 22 is a sectional view showing the constitution of the conventional flat prismatic battery.

With the constitution above, since the pressure is applied from the direction of the extension of the seal-case side-peripheral surface 232, a buckling of the seal-case side-peripheral surface 232 caused by the pressure is prevented. The seal-case side-peripheral surface 232 is 1.2 times or more as thick as the bottom surface 231. This constitution prevents the buckling more efficiently. Since the gasket 204 and the open end of the battery-case side-peripheral surface 222 extend toward the outside of the bottom surface 231 of the seal case 203, it is difficult to connect the battery with another battery. To improve the connectivity, a protrusion 238 formed protruding toward the outside of the case may be formed at the center of the bottom surface 231 as shown in FIG. 16.

With the constitution described above, it is preferable to provide a simple substance or an alloy of nickel or aluminum with a thickness of 0.005 mm or more as a protection layer on the inner surface of the battery case 102 serving as the positive electrode of the flat prismatic battery 100. This prevents the base material metal (stainless steel in this case) from dissolving due to an electrical potential difference. Means such as cladding, plating or vapor deposition forms the protection layer. While the battery case 102 is set to the positive electrode, and the seal case 103 is set to the negative electrode in the present embodiment, the positive electrode and the negative electrode may be set inversely.

When the outer surfaces of the battery case 102 and the seal case 103 are finished as matt, the contact resistance increases during welding the lead plates, and the welding becomes easy.

While the present embodiment shows an example where the winding structure is applied to the electrode plate group 5 for increasing the battery capacity, it is possible to apply an electrode structure where a positive pellet and a negative pellet formed as a rounded square corresponding to the shape of the inner space of the battery are placed opposing to each other with a separator interposed therebetween.

While the plane shape of the flat prismatic battery 100 is a square with rounded corners in the embodiment, it is possible to form the plane shape as a rectangle without an excessive difference between the long side and the short side. It is also possible to form the plane shape as a polygon having four edges or more.

INDUSTRIAL APPLICABILITY

With the flat battery of the present invention, since the sealing is secured even for the prismatic shape, and the electrode plate group with the wound structure is effectively sealed in the storage space inside the battery to increase the discharge capacity, the flat battery is effective as a battery power source for a portable device and the like which requires high battery capacity as well as a small size.

The invention claimed is:
1. A flat prismatic battery comprising:
a metal battery case formed as a polygonal half-shell body provided with a battery-case side-peripheral wall and defining a battery case opening;
a metal seal case formed as a polygonal half-shell body provided with a seal-case bottom wall and a seal-case side-peripheral wall extending from said seal-case bottom wall to a seal-case peripheral wall top edge distal from said seal-case bottom wall, said seal-case side-peripheral wall and said seal-case bottom wall defining a seal case opening, said seal-case side-peripheral wall including a step having:
a step riser narrowed portion at a position adjacent said seal-case bottom wall;
a step riser widened portion at a position adjacent said seal-case peripheral wall top edge; and
a step portion connecting said step riser narrowed portion and said step riser widened portion;
said battery case opening and said seal case opening being disposed opposing to each other with said seal case inverted to define an inner space and having a gasket interposed therebetween;
a power generation element disposed in said inner space;
said step narrowed portion being separated from said battery-case side-peripheral wall by a predetermined interval;
said gasket being pressed between an open end of said battery-case side-peripheral surface and said step for sealing;
a part of said seal-case side-peripheral wall extending from a seal-case bottom inner surface of said seal-case bottom wall of said seal case to said step portion and forming said step riser narrowed portion, and said step portion are so formed as to have a thickness of 1.2 times or more of a thickness of said seal-case bottom wall; and
said step riser widened portion of said seal-case side-peripheral wall having a thickness less than said step riser narrowed portion.
2. A flat prismatic battery, comprising:
a metal battery case formed as a polygonal half-shell body provided with a battery-case side-peripheral surface; and
a metal seal case formed as a polygonal half-shell body provided with a seal-case side-peripheral wall including a step narrowed at a position corresponding to a height of said battery-case side-peripheral surface while separated from said battery-case side-peripheral surface by a predetermined interval, wherein:
an inner space is formed by placing individual openings of said battery case and said seal case opposing to each other with a gasket interposed therebetween and a power generation element is housed in said inner space,
said gasket is pressed between an open end of said battery-case side-peripheral surface and said step for sealing,
a part of said seal-case side-peripheral wall from a seal-case bottom inner surface of a seal-case bottom wall of said seal case to said step, and said step are so formed as to have a thickness of 1.2 times or more of a thickness of said seal-case bottom wall, and
said bottom surface has a recess formed on said seal-case bottom wall along individual peripheral edges and inside of said individual peripheral edges of said seal-case bottom wall of the seal case.

3. A flat prismatic battery comprising:

a metal battery case formed as a polygonal half-shell body provided with a battery-case side-peripheral wall and a battery case bottom wall together defining a battery case opening;

a metal seal case formed as a polygonal half-shell body provided with a seal-case side-peripheral wall and a seal-case bottom wall together defining a seal case opening, said seal-case side-peripheral wall extending from said seal-case bottom wall to a seal-case peripheral wall top edge distal from said seal-case bottom wall;

said battery case and said seal case being disposed opposing to each other with said seal case inverted in said battery case such that an inner space is defined between the battery case and the seal case and a gasket is interposed between the battery case and the seal case;

a power generation element disposed in said inner space said gasket being pressed between an open end of said battery-case side-peripheral wall and a seal-case bottom outer surface of said seal-case bottom wall for sealing, and said seal-case side-peripheral wall being formed to have a thickness of 1.2 times or more of a thickness of the seal-case bottom wall, said seal-case side-peripheral wall having said 1.2 times or more thickness extending from a position adjoining a bend connecting said seal-case side-peripheral wall to said seal-case bottom wall.

4. The flat prismatic battery according to claim 3, wherein a protrusion is formed so as to protrude toward outside of the seal case at a center of the seal-case bottom outer surface of the seal case.

* * * * *

UNITED STATES PATENT AND TRADEMARK OFFICE
CERTIFICATE OF CORRECTION

PATENT NO. : 7,348,098 B2 Page 1 of 1
APPLICATION NO. : 10/936305
DATED : March 25, 2008
INVENTOR(S) : Tetsuya Hayashi et al.

It is certified that error appears in the above-identified patent and that said Letters Patent is hereby corrected as shown below:

Title Page;
Patent Office omitted the listing of the priority data:

(30) Foreign Application Priority Data

--Oct. 13, 2000  (JP) ………………..2000-312908--; and
--Oct. 30, 2000  (JP) ………………..2000-330916--

Signed and Sealed this

Twelfth Day of August, 2008

JON W. DUDAS
*Director of the United States Patent and Trademark Office*